United States Patent [19]

Hecht

[11] Patent Number: 5,870,967
[45] Date of Patent: Feb. 16, 1999

[54] VEHICLE DRIVER ALERTING SYSTEM

[75] Inventor: Robert L. Hecht, Trollhättan, Sweden

[73] Assignee: Lear Corporation, Southfield, Mich.

[21] Appl. No.: 920,762

[22] Filed: Aug. 29, 1997

[51] Int. Cl.⁶ .................................................. B60N 2/44
[52] U.S. Cl. ................. 116/28 R; 116/303; 296/68.1; 70/261
[58] Field of Search .................... 116/28 R, 283, 116/303; 297/378.11, 378.12, 378.13, 378.1; 296/63, 68.1, 65.01; 70/432, 441, 261

[56] References Cited

U.S. PATENT DOCUMENTS

| | | | |
|---|---|---|---|
| 4,636,005 | 1/1987 | Bolz et al. | 297/378.13 |
| 4,639,040 | 1/1987 | Fujita et al. | |
| 4,705,319 | 11/1987 | Bell | 297/378.11 |
| 5,562,325 | 10/1996 | Moberg . | |
| 5,664,839 | 9/1997 | Pedronno et al. | 297/378.13 |
| 5,716,100 | 2/1998 | Lang | 297/378.12 |
| 5,743,593 | 4/1998 | Vogt | 297/378.12 |
| 5,762,401 | 6/1998 | Bernard | 297/378.13 |

*Primary Examiner*—Diego Gutierrez
*Assistant Examiner*—Andrew Hirshfeld
*Attorney, Agent, or Firm*—Brooks & Kushman PC

[57] ABSTRACT

An alert system for alerting the driver of a vehicle when a seatback is unlatched includes a seatback movable between latched and unlatched positions, and a latch for retaining the seatback in the latched position. A handle is connected to the latch and includes a first portion movable for operating the latch to facilitate movement of the seatback to the unlatched position and a second portion operable for alerting the driver when the seatback is in its unlatched position. The first and second portions of the handle are sufficiently pivotable and unitary that movement of the first portion for operating the latch simultaneously operates the second portion for alerting the driver.

5 Claims, 3 Drawing Sheets

VEHICLE DRIVER ALERTING SYSTEM

TECHNICAL FIELD

The present invention relates to a driver alerting system for a vehicle, and more particularly to an alerting system for alerting the driver of a vehicle when a seatback is unlatched.

BACKGROUND OF THE INVENTION

Many vehicle seating systems include a rear seat with a pivotable seatback. Such pivotable seatbacks are typically provided for enhancing storage capacity behind the rear seat or for providing access to a vehicle trunk from inside the passenger compartment. Such pivotable seat designs are also useful in enabling smaller vehicles to store long items, such as skis, by folding down the pivotable seatback, and extending the skis from the trunk across the folded seatback and into the passenger compartment.

It is desirable to prevent improper latching of the seatback in the upright position for safety reasons, particularly when child seats are used in the rear seat. Accordingly, it is further desirable to provide an alerting system for alerting the vehicle driver when a rear seatback is not properly latched in its upright position.

DISCLOSURE OF THE INVENTION

The vehicle driver alerting system of the present invention has been developed for alerting the driver of a vehicle when a rear seatback is unlatched by providing a seatback latch handle including a portion which is operable for alerting the driver when the seatback is in its unlatched position. The portion operable for alerting the driver is preferably positioned in a manner which is viewable by the driver through the rearview mirror.

More specifically, the present invention provides an alert system including a seatback movable between latched and unlatched positions, and a latch for retaining the seatback in the latched position. A handle is connected to the latch, and includes a first portion movable for operating the latch to facilitate movement of the seatback to the unlatched position. The handle further includes a second portion operable for alerting the driver when the seatback is in the unlatched position.

Preferably, the first and second portions of the handle are sufficiently pivotable and unitary that movement of the first portion for operating the latch simultaneously operates the second portion for alerting the driver. By forming the first and second portions of the handle of a unitary structure, extra alerting components are not required.

The second portion of the handle preferably has an appearance finish of sufficient visual impact to enhance the alerting of the driver when the seatback is in its unlatched position. For example, the second portion could be brightly colored or cross-hatched, or could be illuminated in some way to facilitate alerting of the driver.

Accordingly, an object of the present invention is to provide an alerting system for alerting the driver of a vehicle when a seatback is unlatched, wherein the alerting system is a unitary part of the latch handle for automatically displaying an alerting surface when the seatback is not fully latched.

A further object of the present invention is to provide an alerting system for alerting the driver of a vehicle when a seatback is unlatched, wherein the alerting member is within the view of the driver through the rearview mirror of the vehicle.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
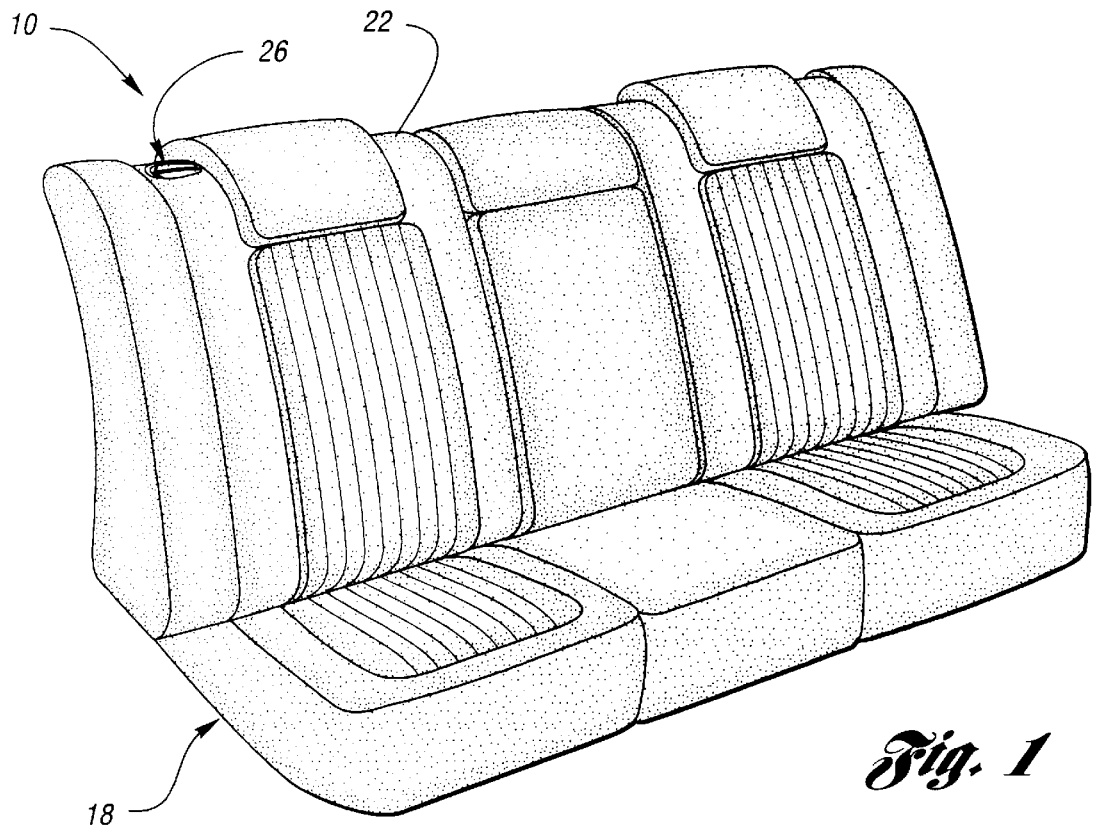
FIG. 1 is a perspective view of a vehicle seat assembly incorporating a driver alerting system in accordance with the present invention.

Referring to FIGS. 1–5, a vehicle driver alerting system 10 is shown in accordance with the present invention. A front seat assembly 12 is provided in the vehicle, as well as a steering wheel 14, rear view mirror 16, and rear seat assembly 18.

Figure 2:
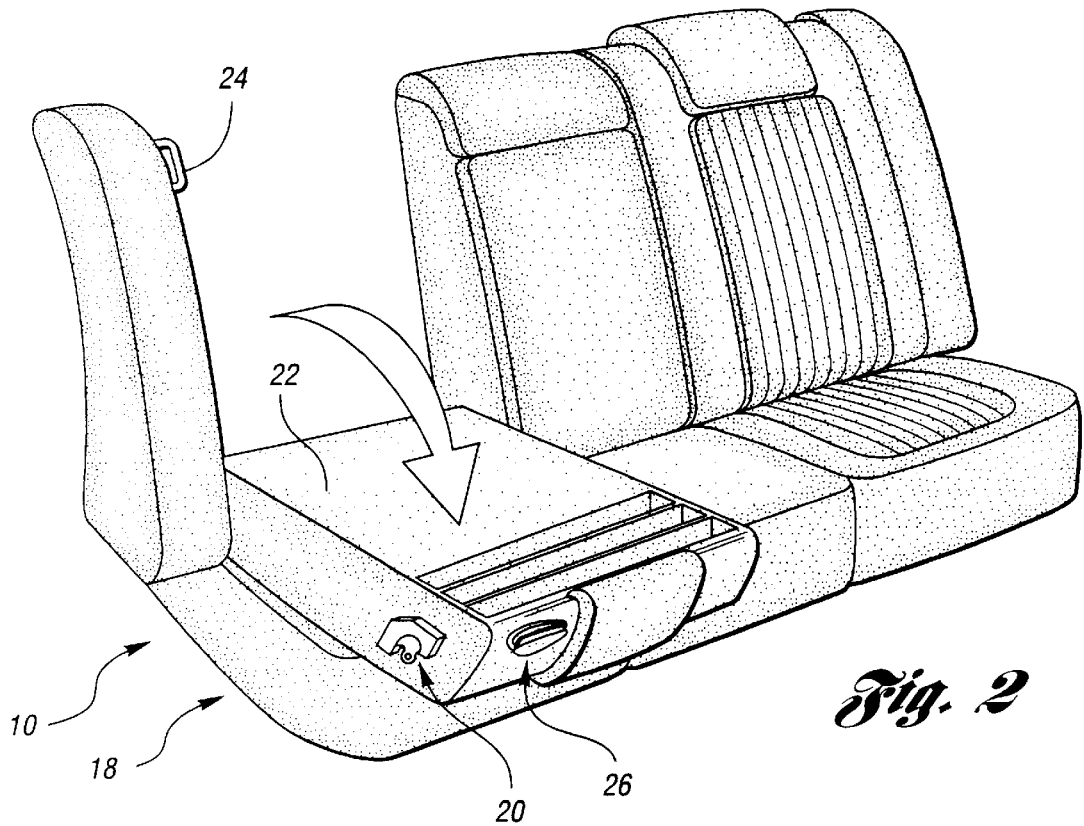
FIG. 2 is a perspective view of the vehicle seat assembly of FIG. 1, with the seatback pivoted to the collapsed position.

As shown in FIG. 2, a latch 20 is provided for attaching the seatback 22 to the latch rod 24 for securing the seatback 22 in the upright position, shown in FIG. 1.

The seatback 22 includes a handle 26 operatively connected to the top portion of the seatback 22 for operating the latch 20. Accordingly, operation of the handle 26 facilitates movement of the seatback 22 between the latched position shown in FIG. 1 and the unlatched position shown in FIG. 2.

Figure 3:
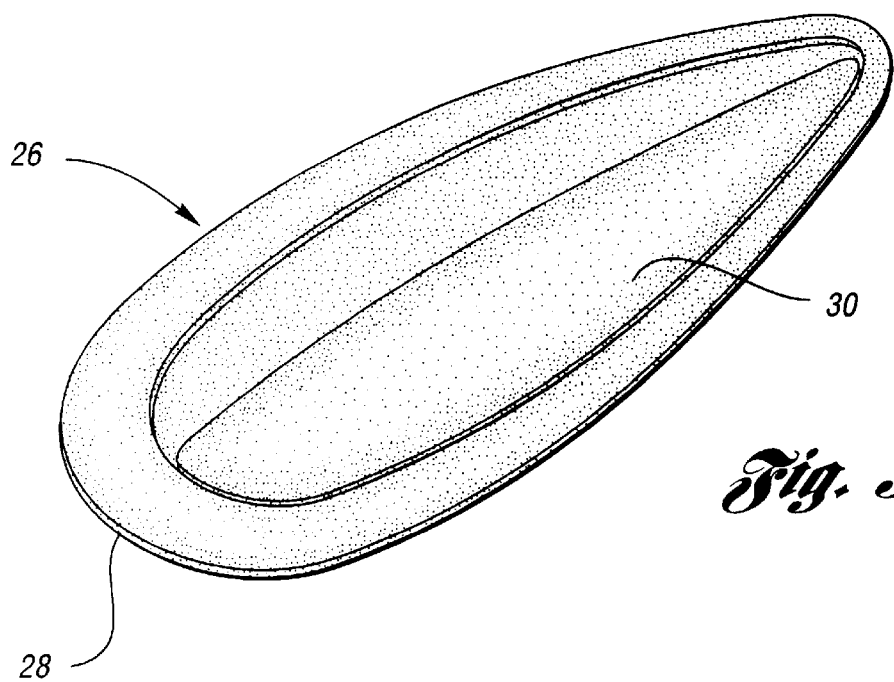
FIG. 3 is a perspective view of a latch handle assembly in accordance with the present invention with the latch handle in the latched position.
Figure 4:
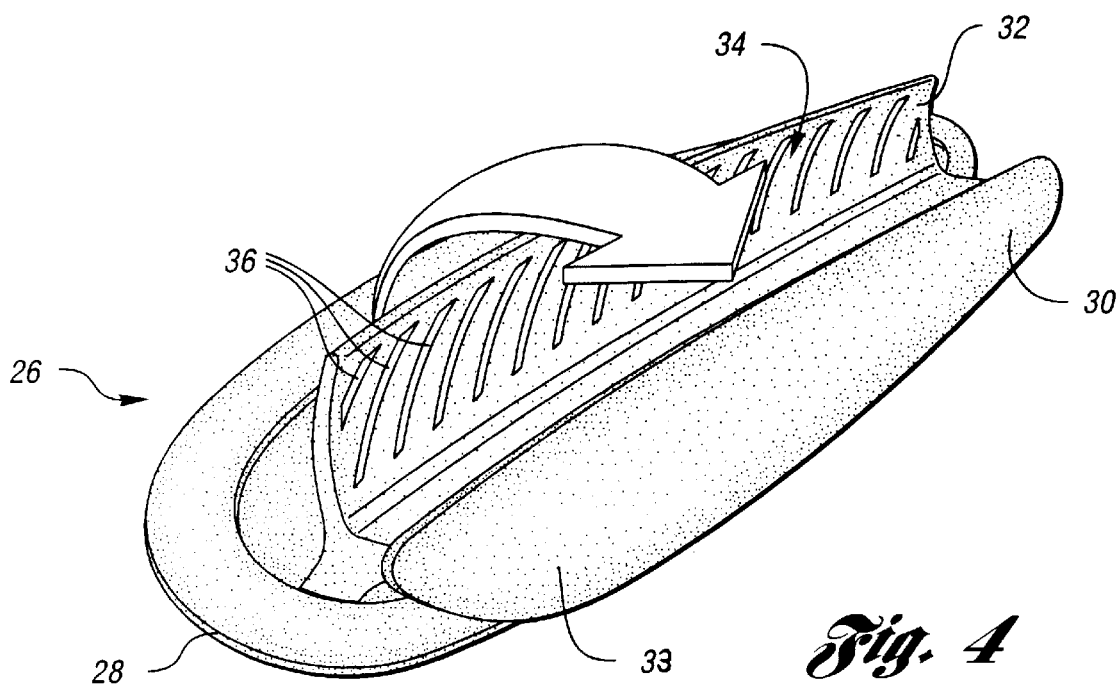
FIG. 4 is a perspective view of the latch handle assembly of FIG. 3 with the latch handle in the unlatched position.

As shown in FIGS. 3 and 4, the handle 26 includes a trim piece 28 which surrounds the periphery of the first and second movable handle portions 30, 32. The first portion 30 is configured for grasping for unlatching the latch 20. The first portion 30 includes an appearance surface 33 configured to blend with the appearance finish of the trim piece 28.

The second portion 32 acts as an indicator member by means of an alerting appearance finish 34 exposed thereon when the second portion 32 extends from the trim piece 28.

The first and second portions 30, 32 are sufficiently pivotable and unitary that movement of the first portion 30 for operating the latch 20 simultaneously operates the second portion 32. As shown, the second portion 32 includes the alerting appearance finish 34, which may comprise stripes 36 for sufficient visual impact to enhance the alerting of the driver when the seatback 22 is in its unlatched position. Alternatively, the alerting appearance finish could be a bright color, such as red, or could be illuminated in some way in order to attract the attention of the driver.

Figure 5:
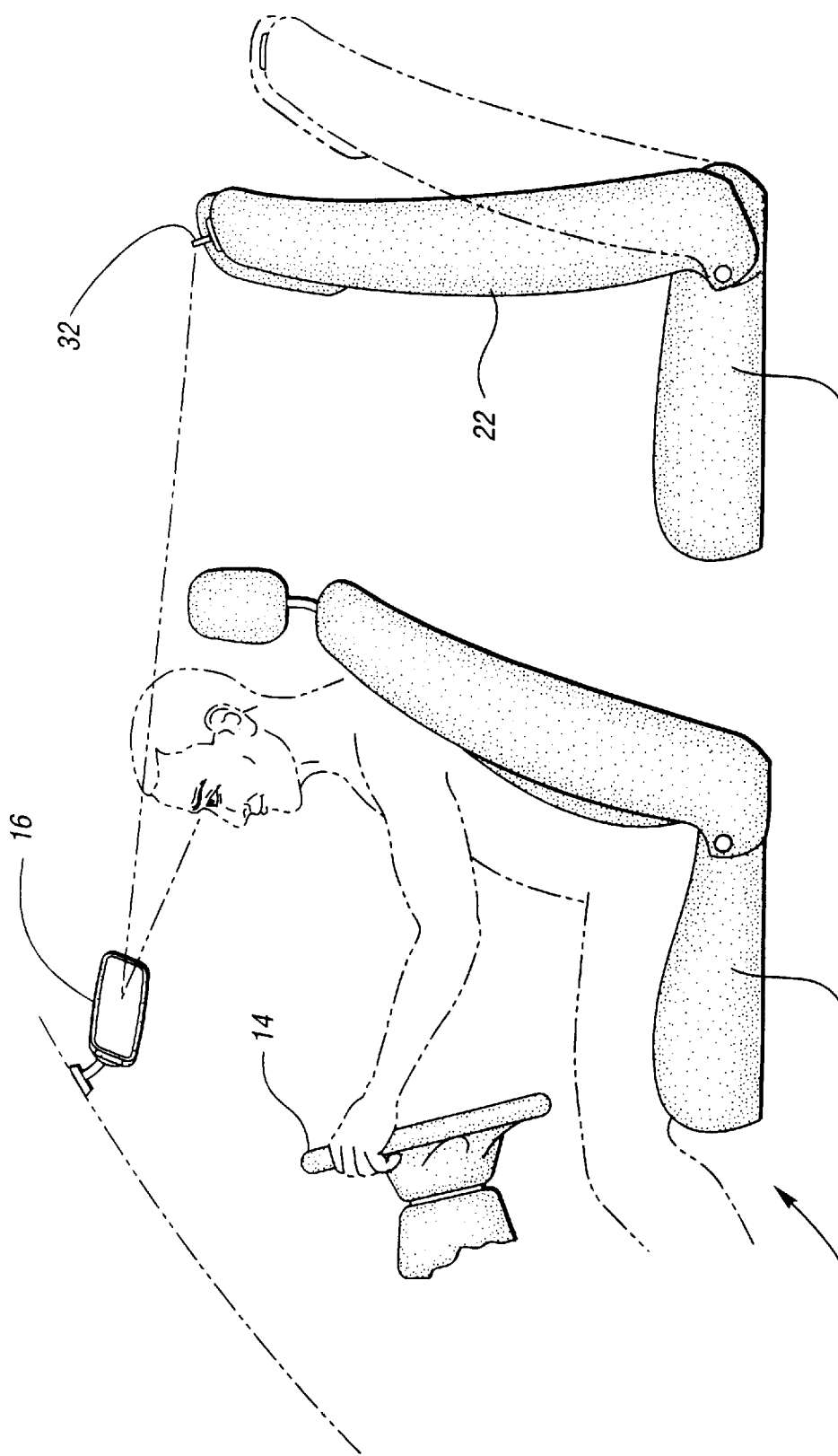
FIG. 5 is a schematically arranged side view of a vehicle driver alerting system in a vehicle in accordance with the present invention.

As shown in FIG. 5, when the seatback 22 is not in the latched position (shown in phantom), the second portion 32 projects upwardly and is reflected to the driver through the rearview mirror 16 when in such unlatched position. Accordingly, the driver is immediately alerted when the rear seatback 22 is not properly latched.

The first and second portions 30, 32 are configured for movement together, such that in the latched position shown in FIG. 3, the second portion 32 is covered by the first portion 30, and in the unlatched position the second portion 32 is exposed over the first portion 30 for viewing by the driver.

This unitary handle design eliminates the need for additional alerting features or components, and does not detract from the aesthetic appearance of the latch and handle assembly.

The first and second portions 30, 32 of the handle are preferably formed of a single injection molded plastic part. The alerting appearance finish 34 could be accomplished by means of a sticker, paint, illumination, etc.

Supporting disclosure for a vehicle seatback latching system may be found in commonly owned U.S. patent application Ser. No. 08/745,001, filed Nov. 7, 1996, hereby incorporated by reference in its entirety.

While the best mode for carrying out the invention has been described in detail, those familiar with the art to which this invention relates will recognize various alternative designs and embodiments for practicing the invention within the scope of the appended claims.

What is claimed is:

1. An alert system for alerting a driver of a vehicle when a seatback is unlatched, said system comprising:

said seatback movable between latched and unlatched positions;

a latch for retaining said seatback in said latched position;

a handle connected to said latch and having a first portion movable for operating said latch to facilitate movement of said seatback to said unlatched position and a second portion operable for alerting the driver when said seatback is in its unlatched position; and wherein said first portion comprises an appearance surface configured to blend with said seat back, said second portion has an appearance finish substantially different than said appearance surface of the first portion and of sufficient visual impact to enhance the alerting of the driver when said seatback is in its unlatched position, and said first and second portions are configured such that said second portion is hidden below the first portion when the seat back is in its latched position so that the second portion is not in a position to be viewable by the driver, and wherein said second portion extends above said first portion when said seatback is in its unlatched position.

2. The alert system of claim 1 wherein said first and second portions of said handle are sufficiently pivotable and unitary that movement of said first portion for operating said latch simultaneously operates said second portion for alerting the driver.

3. The alert system of claim 2 including a mirror adapted for attachment to the vehicle for reflecting the second portion of said handle so that the second portion is in a position to be viewable by the driver when said seatback is in its unlatched position.

4. A vehicle driver alerting system for alerting a driver when a pivotable seatback is unlatched in a vehicle, comprising:

a front seat assembly secured in the vehicle;

a rearview mirror secured in the vehicle adjacent the front seat assembly;

a rear seat assembly having said pivotable seatback pivotable between upright and collapsed positions; and a latch assembly for selectively latching the seatback in the upright position;

wherein said latch assembly comprises a handle member and an indicator member, the indicator member having an alerting appearance finish, said alerting appearance finish being in a position above the handle member to be viewable by the vehicle driver through the rearview mirror when the latch assembly is unlatched to indicate that the seatback is not latched in the upright position; and wherein said indicator member is hidden below the handle member when the latch assembly is latched so that the indicator member is not in said position to be viewable by the driver.

5. The vehicle driver alerting system of claim 4 wherein said handle member and indicator member are sufficiently pivotable and unitary that movement of said handle member for operating said latch assembly simultaneously operates said indicator member for moving the indicator member to the position to be viewable by the driver.

* * * * *